United States Patent [19]
Gambut et al.

[11] Patent Number: 5,270,678
[45] Date of Patent: Dec. 14, 1993

[54] MAGNETIC RAIL CHUCK

[75] Inventors: Jean-Michel Gambut; Pierre Doyelle, both of Montmelian, France

[73] Assignee: Walker Magnetics Group, Inc., Worcester, Mass.

[21] Appl. No.: 847,319

[22] Filed: Mar. 6, 1992

[51] Int. Cl.$^5$ .......................... B25B 11/00; H01F 7/20
[52] U.S. Cl. .................................. 335/289; 269/8; 335/295; 335/286
[58] Field of Search ................ 335/285–295, 335/296, 298; 269/8; 294/65.5, 88

[56] References Cited

U.S. PATENT DOCUMENTS

| | | |
|---|---|---|
| 1,312,546 | 8/1919 | Karasick . |
| 1,330,558 | 2/1920 | Simmons . |
| 1,336,928 | 4/1920 | Simmons . |
| 3,711,929 | 1/1973 | Blakey et al. . |
| 3,978,441 | 8/1976 | Sobottka et al. ............ 335/289 |
| 4,075,589 | 12/1976 | Braillon ..................... 335/286 |
| 4,090,162 | 5/1978 | Cardone et al. ............ 335/289 |
| 4,356,467 | 10/1982 | Cardone et al. ............ 335/295 |
| 4,461,463 | 7/1984 | Okubo . |
| 4,837,540 | 6/1989 | Michele et al. . |
| 4,847,582 | 7/1989 | Cardone et al. ............ 335/289 |

FOREIGN PATENT DOCUMENTS

| | | |
|---|---|---|
| 0345554 | 12/1989 | European Pat. Off. ............ 269/8 |
| 1115110 | 10/1961 | Fed. Rep. of Germany . |
| 0186339 | 9/1985 | Japan ........................... 269/8 |
| 0251141 | 12/1988 | Japan ........................... 269/8 |
| 0171737 | 7/1989 | Japan ........................... 269/8 |
| 0098731 | 4/1991 | Japan ........................... 269/8 |
| 0671985 | 7/1979 | U.S.S.R. . |

*Primary Examiner*—Leo P. Picard
*Assistant Examiner*—Raymond Barrera
*Attorney, Agent, or Firm*—Henry D. Pahl, Jr.

[57] ABSTRACT

In the magnetic chuck disclosed herein, a pair of elongate pole members are arranged to provide magnetic contact with a workpiece along parallel lines and thus are somewhat in the nature of rails. Preferably, the ends of the poles are segmented and provide for height adjustment to accommodate workpieces which are not entirely flat. The pole members extend along the sides of an elongate base plate with a space therebetween. Interposed between each pole member and the base member is a relatively thin layer of permanent magnetic material which resists de-magnetation. A switchable permeable magnet is provided between the pole members above the base plate and this latter permanent magnet is surrounded by a coil which allows the polarity of its magnetism to be switched so that it either aids or opposes the thin magnetic layer in polarizing the pole ends.

10 Claims, 4 Drawing Sheets

MAGNETIC RAIL CHUCK

BACKGROUND OF THE INVENTION

The present invention relates to a magnetic chuck for holding a permeable workpiece and more particularly to such a chuck which is switchable and elongate for providing a pair of rail like lines of magnetic contact with the workpiece.

While variable switchable forms of magnetic chucks have been proposed heretofor, they have typically not been well suited for handling large workpieces, particularly large workpieces which do not present an entirely flat surface for contact with the magnetic chuck.

Among the several objects of the present invention may be noted the provision of a magnetic chuck of novel configuration; the provision of such a chuck which is switchable between holding and non-holding states; the provision of such a chuck which is adapted to effectively hold large workpieces; the provision of such a chuck which will accommodate workpieces presenting a non-flat surface; the provision of such a chuck which is adjustable to accommodate pieces of varying shape; the provision of a chuck which can be flexibly utilized in combination with other chucks of similar design; the provision of such a chuck which is highly reliable and relatively inexpensive construction. Other objects and features will be in part apparent and in part pointed out hereinafter.

SUMMARY OF THE INVENTION

Briefly, the present invention provides an elongate rail chuck in which a pair of upstanding elongate pole members extend along respective sides of an elongate permeable base plate with a space therebetween. Interposed between each pole member and the base plate is a relatively thin layer of a permanent magnetic material which resists demagnetization. Between the pole members and spaced above the base plate is an elongate magnet of a material whose polarity can be easily reversed. A coil is provided around that magnet for selectively reversing its polarity. In a preferred implementation of the invention, the tops of each of the pole members is inclined, upwardly from the outside of the elongate chuck toward the space between the pole members, and a plurality of pairs of pole ends are provided each pair of which has lower surfaces which are inclined to match the inclined tops of the pole members. Accordingly, the height of the tops of the pole members can be adjusted by varying the lateral spacing between them.

BRIEF DESCRIPTION OF THE DRAWING

Corresponding references characters indicate corresponding parts through the several views throughout the drawings.

DESCRIPTION OF THE PREFERRED EMBODIMENT

Figure 1:
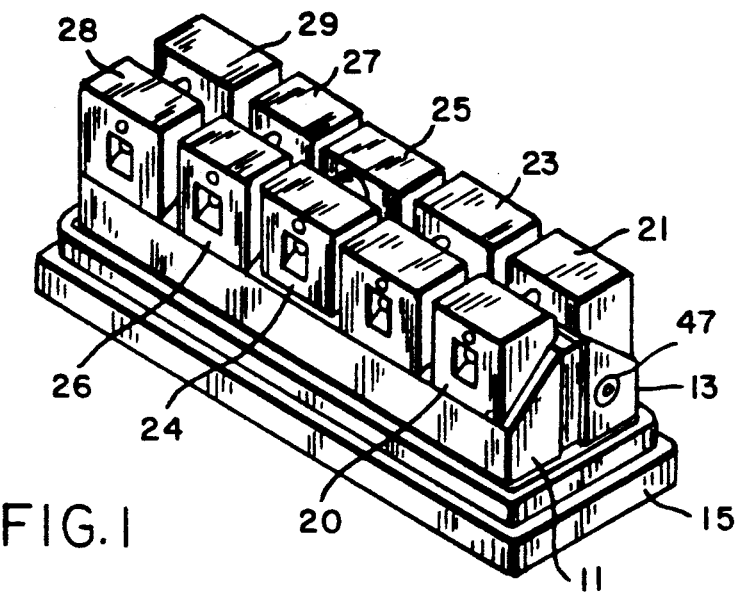
FIG. 1 is a perspective view of an elongate magnetic rail chuck in accordance with the present invention.

Referring now to FIG. 1, the chuck illustrated there is elongate and provides a pair of somewhat rail-like elongate pole members 11 and 13 which extend along respective sides of an elongate base plate 15 with a space or gap between the pole members 11 and 13. As is explained in greater detail hereinafter, the pole members 11 and 13 are provided with segmented pole end pieces 20-29 which are adjustable heightwise so that the chuck can accommodate work pieces which do not present a perfectly flat surface to the chuck. Pole members 11 and 13, the base plate 15 and the pole ends 20-29 are all constructed of a highly permeable material e.g., mild steel.

Figure 2:
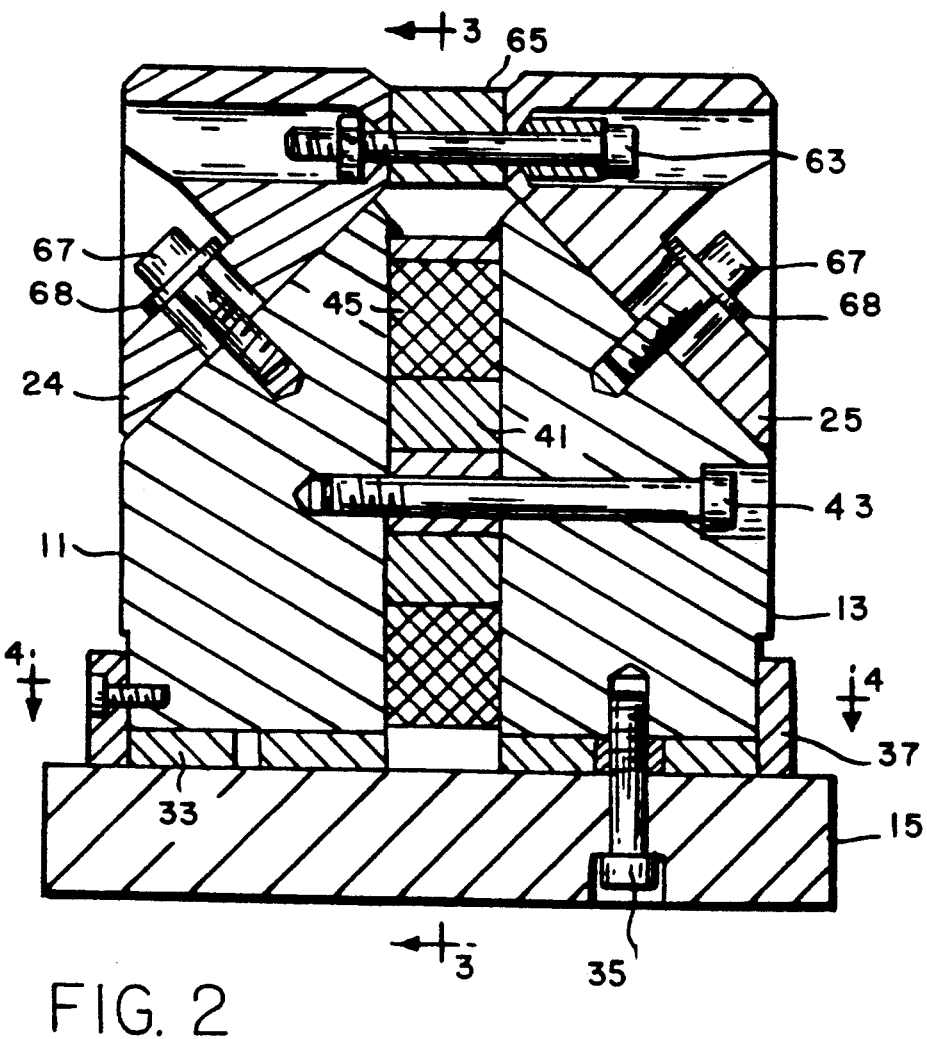
FIG. 2 is an endwise cross-sectional view of the chuck of FIG. 1 taken midway along the length of the chuck.
Figure 3:
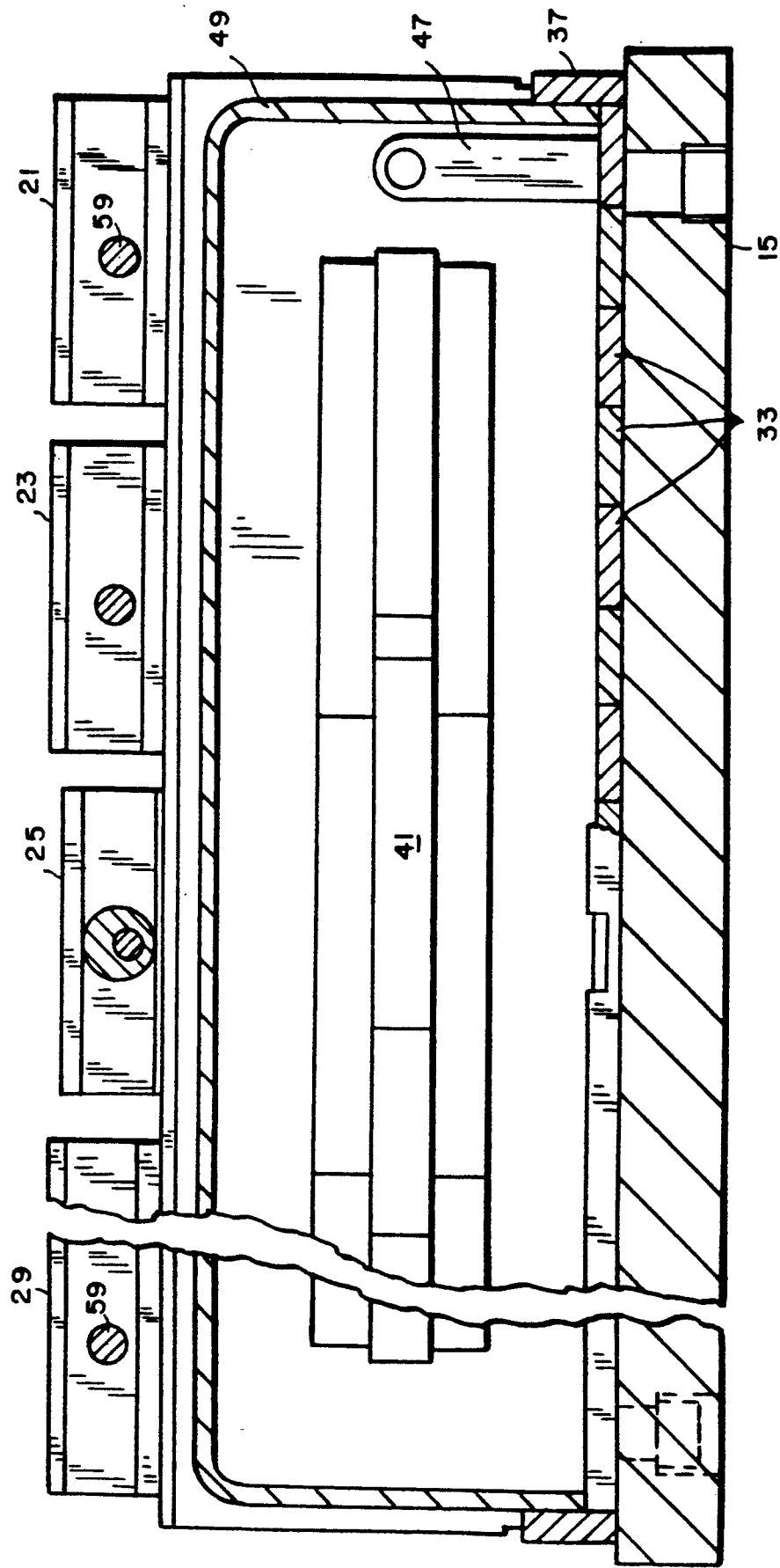
FIG. 3 is a side cross-sectional view taken essentially on the line 3—3 of FIG. 2.
Figure 4:
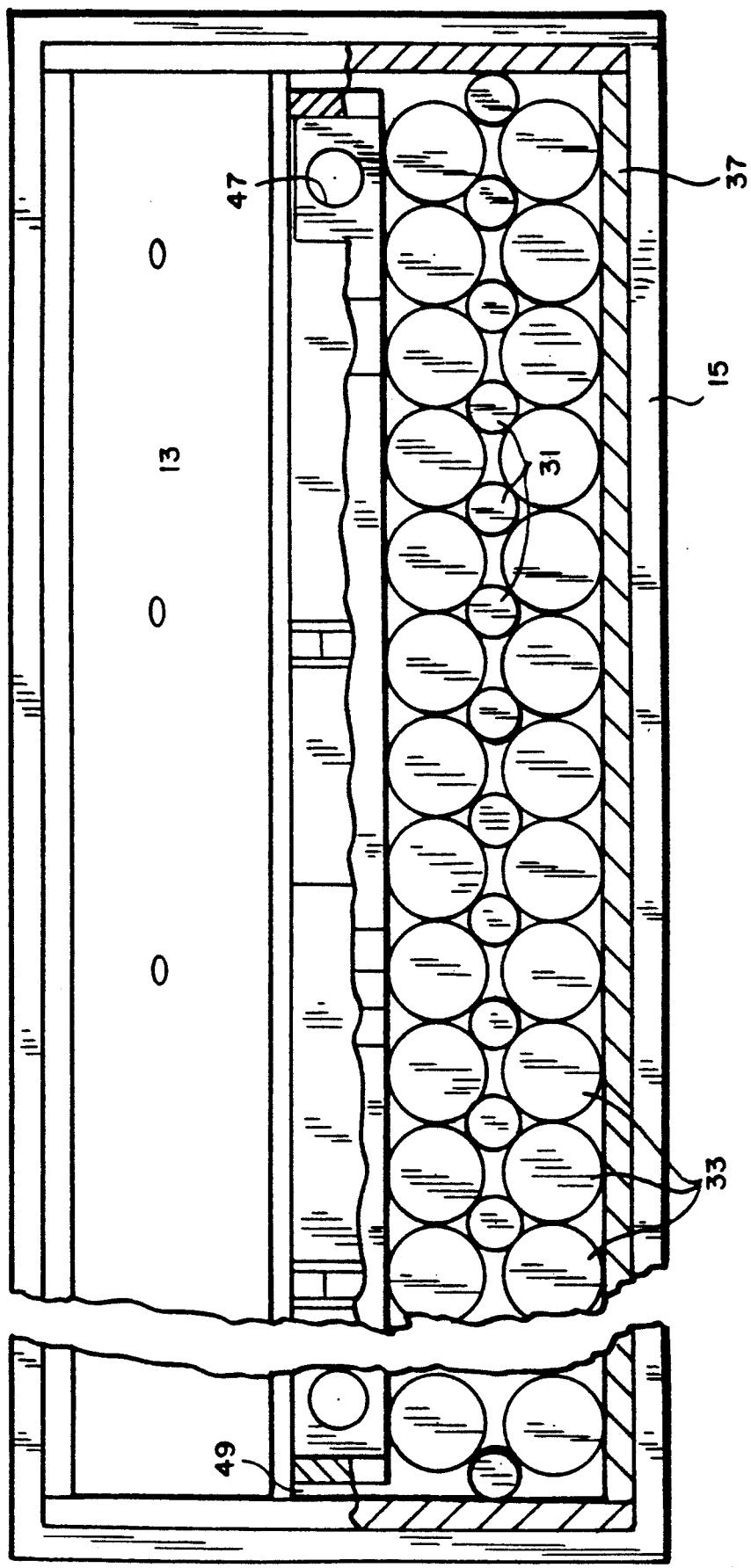
FIG. 4 is a top or plan cross-sectional view taken essentially on the line 4—4 of FIG. 3.

As may be seen in FIGS. 2 and 3, a relatively thin layer of a high coercive magnetic material is interposed between each of the pole members 11 and 13 and the base plate 15. This layer is quite thin as compared with the height of the pole members 11 and 13. Preferably, this magnetic material is a rare earth magnetic material such as a Neodymium alloy. Such material is available in disk form and two sizes of such disks are employed as indicated by reference characters 31 and 33. The disks are clamped between the pole members and the base plate by means of non-magnetic cap screws 35. The non-magnetic layer is shrouded and protected from dirt and cutting tips by a non-magnetic band as indicated by reference character 37.

In the gap between the pole members 11 and 13, at a height spaced above the base plate 15, is an elongate permanent magnet 41. This magnet, which may be made up of a group of rectangular pieces as shown, is preferably constructed of a magnetic material, e.g. Alnico, whose polarity can be relatively easily reversed as compared with the Neodymium magnets 31 and 33. The magnet 41 is clamped between the pole members 11 and 13 by means of non-magnetic cap screws 43.

The Alnico magnet 41 is surrounded by an elongate winding or coil 45 which lies in the plane of the gap between the pole members 11 and 13 and which can be energized to selectively reverse the polarity of the magnet. Wiring access to the coil 45 is obtained through a port 47 cut through the pole member 13. The winding 45 is protected by a non-magnetic band 49 which bridges the gap between the pole members 11 and 13.

When the Alnico magnet is polarized so that its coercive force aids that of the Neodymium magnetic layer in polarizing the pole members 11 and 13, the chuck is in its energized or holding state and a magnetic circuit will be established in which substantial flux extends up through the pole ends 20-29, linking a workpiece and holding it to the chuck. Conversely, when the polarity of the Alnico magnet 41 is reversed, a closed magnetic circuit is formed in the lower part of the structure and essentially no or very little flux is projected out of the pole ends. In this condition, a workpiece can be placed on or removed from the chuck.

Figure 5:
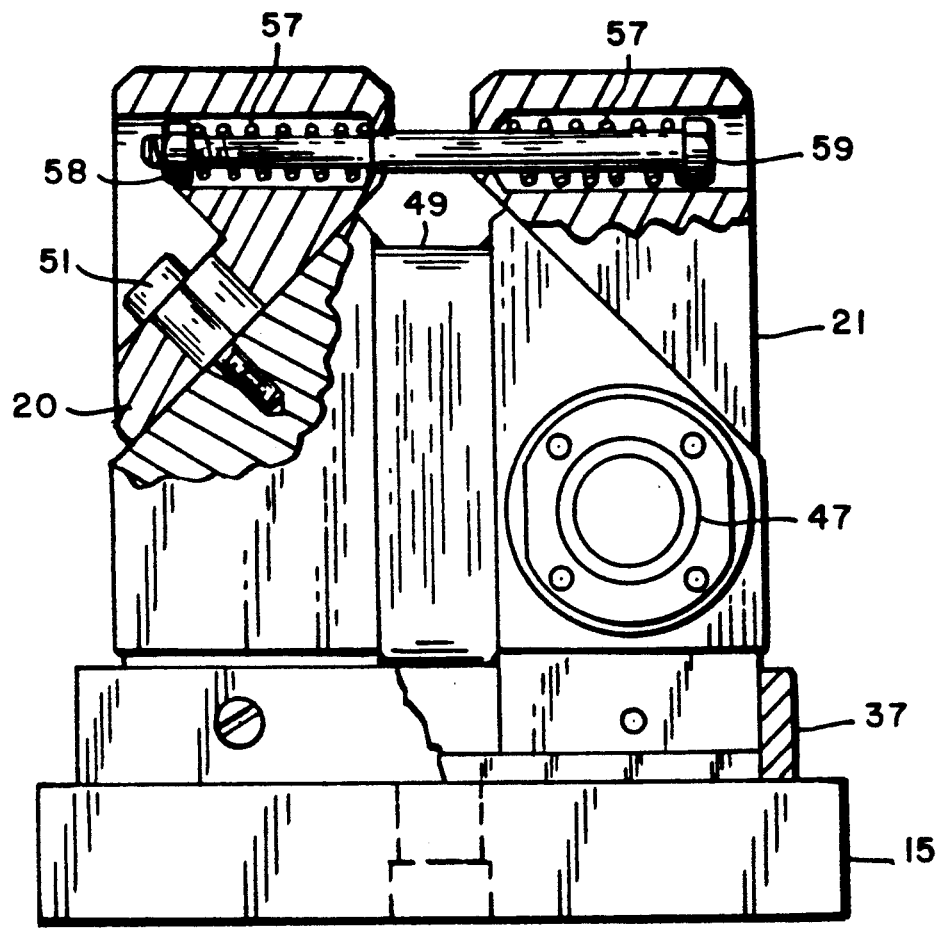
FIG. 5 is an endwise cross-sectional view taken essentially on the line 5—5 of FIG. 3.

As indicated previously, the upper ends or tops of each of the pole members 11 and 13 is inclined upwardly from the outside of the chuck towards the space between the pole members. An inclination of 45° is appropriate as illustrated. The pole ends 20-29 are essentially triangular in cross-section as illustrated with the top surfaces of each pair being coplanar or a least parallel and with the bottom surfaces mating with the corresponded respective inclined surfaces of the pole members 11 and 13. As will be understood, the pole ends can slide with respect to the respective pole members so that, in effect, pole height is locally adjustable by varying the lateral spacing between each pair of pole ends 20-29. The extent of movement of pole end pieces 20-23 and 26-29 is constrained by headed posts 51 which extend through slots milled in the pole end pieces as illustrated in FIG. 5. These pole ends are biased to their most raised and closest together positions by means of springs 57 which urge the pole ends pieces in each pair towards each other. The springs 57 react against the opposite ends of a concentric pin formed by nut 58 and bolt 59.

The center pair of pole end pieces (24 and 25) is preferably clamped at a fixed height and separation which is intermediate the highest and lowest positions of the other or floating pole end pieces. This clamping is provided by means of a non-magnetic bolt 63 which clamps the pair together with a non-magnetic space 65 therebetween and by cap screws 67 and washers 68 which clamp these particular pole ends to the respective pole members 11 and 13.

By means of this arrangement, a workpiece placed on the rail chuck illustrated will settle so that the portion of the workpiece aligned with the middle pole end pieces 24 and 25 will come into contact with them and the other pole end pieces (20-23 and 26-29) will essentially self-adjust to a height which causes them to best contact the workpiece. At this point, the Alnico magnet may be switched so as to cause its magnetic force to aid that of the Neodymium disks 31 and 33 and thereby causing the workpiece to be held. As will be understood by those skilled in the art, this same magnetic force will tend to lock the floating pole endpieces to the respective pole members so that any further relative movement is inhibited and machining or grinding operations can take place on the workpiece.

Typically magnetic rail chucks of the present invention will be used in multiple sets, i.e. pairs or triplets, so as to accommodate workpieces which are relatively large. Because of the rail like configuration of the chucks of the present invention, positioning of the separate units can be flexibly arranged to accommodate many varied workpieces. As noted previously, because of the height-adaptive nature of each of the magnetic rail chucks, the workpiece need not present a large flat surface in order for the chucks to obtain effective holding power.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. An elongate magnetic rail chuck for holding a permeable workpiece, said chuck comprising:
    an elongate permeable base plate;
    a pair of upstanding, elongate pole members extending along respective sides of said baseplate with a space therebetween;
    interposed between each pole member and said baseplate, a relatively thin layer of a permanent magnet material which resists demagnetization;
    between said pole members, at a height providing a space above said base plate, an elongate magnet of a permanent magnetic material whose polarity can be relatively easily reversed; and
    around said magnet, a coil for selectively reversing the polarity of said magnet.

2. A chuck as set forth in claim 1 wherein the top of each of said pole members is inclined upwardly from the outside of the elongate chuck toward the space between the pole members and wherein said chuck includes a plurality of pairs of pole ends each pair of which have parallel upper surfaces and have lower surfaces which are inclined to match with the inclined tops of the respective pole members, thereby to permit the height of the top surfaces to adjust by varying the lateral spacing between the pole ends in each pair.

3. A magnetic chuck as set forth in claim 1 wherein the material of said thin layer is a Neodymium alloy.

4. A magnetic chuck a set forth in claim 1 wherein the material of said elongate magnet is Alnico.

5. A magnetic chuck as set forth in claim 2 wherein the tops of said pole members are inclined at about 45°.

6. A magnetic chuck a set forth in claim 2 further comprising spring means for biasing the pole ends in at least some of said pairs toward each other thereby to cause the pair to rise up on the inclined surfaces of said pole members.

7. A magnetic chuck as set forth in claim 6 wherein there are five pairs of pole ends distributed along the lengths of said pole members and the middle pair is clamped at a fixed height below the maximum height of the spring biased pairs.

8. An elongate magnetic rail chuck for holding a permeable workpiece, said chuck comprising:
    an elongate permeable base plate;
    a pair of upstanding, elongate pole members extending along respective sides of s id baseplate with a gap therebetween, the top of each of said pole members being inclined upwardly from the outside of the elongate chuck toward said gap;
    interposed between each pole member and said baseplate, a relatively thin layer of a permanent magnet material;
    between said pole members, an elongate magnet of a permanent magnetic material whose polarity can be relatively easily reversed;
    around said magnet, a coil lying parallel to said gap for selectively reversing the polarity of said elongate magnet; and
    a plurality of pairs of pole end pieces, the pieces in each pair having parallel top surfaces and having lower surfaces which are inclined to match with the inclined tops of respective pole members, thereby to permit the height of the top surfaces to adjust by varying the lateral spacing between the pole ends in each pair.

9. An elongate magnetic rail chuck for holding a permeable workpiece, said chuck comprising:
    an elongate permeable base plate;
    a pair of upstanding, elongate pole members extending along respective sides of said baseplate with a gap therebetween, the top of each of said pole members being inclined upwardly at an angle of about forty five degrees from the outside of the elongate chuck toward said gap;
    interposed between each pole member and said baseplate, a relatively thin layer of a Neodymium alloy magnet material;

between said pole members, an elongate Alnico magnet;

around said magnet, a coil lying parallel to said gap for selectively reversing the polarity of said elongate magnet; and a plurality of pairs of pole end pieces distributed along the length of said pole members, the pieces in each pair having parallel top surfaces and having lower surfaces which are inclined to match with the inclined tops of respective pole members, thereby to permit the height o the top surfaces to adjust by varying the lateral spacing between the pole ends in each pair.

10. A chuck as set forth in claim 9 further comprising spring means for biasing the end pieces in at least some of said pairs toward each other thereby to cause the pair to rise up on the inclined surfaces of said pole members.

* * * * *